United States Patent [19]

Remon-Beauvais et al.

[11] 3,791,478

[45] Feb. 12, 1974

[54] APPARATUS FOR CONFINEMENT OF AN AIR CUSHION OF A VEHICLE RIDING ON SAME

[75] Inventors: Philippe Marie Remon-Beauvais, Ris-Orangis; Jean-Luc Barbot, Drancy; Michel Gravelle, Marcoussis, all of France

[73] Assignee: Etat Francais represente par le Ministere d'Etat charge de la Defense Nationale-Delagation Ministerielle pour l'Armement, Paris, France

[22] Filed: Mar. 29, 1972

[21] Appl. No.: 239,163

[30] Foreign Application Priority Data

Mar. 31, 1971 France .............................. 71.11229

[52] U.S. Cl. ................................ 180/121, 180/127
[51] Int. Cl. ............................................ B60v 1/16
[58] Field of Search ... 180/116, 120, 127, 128, 129, 180/130, 117, 118, 119, 121, 122, 123, 124, 125, 126

[56] References Cited
UNITED STATES PATENTS 3,513,933  5/1970  Faure ................................ 180/121
3,420,330  1/1969  Bliss ................................. 180/121
3,331,462  7/1967  Wernicke .......................... 180/116
3,342,278  9/1967  Cocksedge ........................ 180/117
2,969,937  1/1961  Trojahn ............................ 180/117

Primary Examiner—Kenneth H. Betts
Assistant Examiner—Jack D. Rubenstein
Attorney, Agent, or Firm—Eric H. Waters et al.

[57] ABSTRACT

A gas cushion for a vehicle which rides thereon is formed by introducing gas downwardly under pressure through a plurality of peripheral passages at an angle of 30 to 45° relative to the vertical, the gas passing into a central cushion. Arrayed externally of the passages are one or more plenum chambers fed at the bottom with leakage gas from the central cushion to form an auxiliary cushion. The plenum chambers may also be supplied directly at their upper ends with gas. The gas passages are formed by an inclined outer wall and a plurality of wall elements facing the outer wall and which are spaced and overlapped to permit gas within the central cushion to recirculate into the gas flowing in the passages.

10 Claims, 8 Drawing Figures

APPARATUS FOR CONFINEMENT OF AN AIR CUSHION OF A VEHICLE RIDING ON SAME

BACKGROUND OF THE INVENTION

1. Field of the Invention

The present invention relates, in a general manner, to an air cushion vehicle and, more precisely, to a system for the confinement of a gas cushion.

2. Prior Art

In the present-day state of the art, it may be considered that the existing systems for the confinement of a gas cushion for vehicles riding thereon may be divided into two major groups:

a. systems known as "peripheral or annular jet" systems, wherein the gas is injected at high velocity under the entire periphery of the vehicle, thus creating a veritable gas curtain opposing leakage from the interior of the cushion towards the exterior of the cushion;

b. systems known as "plenum chamber" systems, wherein the gas is introduced directly under the entire surface of the vehicle. In these systems, there is no air curtain to oppose the leakage from the interior towards the exterior of the cushion, so that their mass gas flow is greater than those in peripheral jet systems. These systems, due to their aptitude for fractioning, are very suitable for the design of stable vehicles.

Peripheral jet systems have a thrust amplification coefficient which is higher than that of the plenum chamber systems.

Plenum chamber systems have a gas escape velocity which is lower than that of peripheral jet systems.

If W represents the net lift power of a vehicle of weight P, U the gas leakage velocity, A the thrust amplification coefficient and $q$ the mass gas flow rate, the following equations may be written:

$$A = P/qU \qquad W = \tfrac{1}{2}qU^2$$

$$\text{i.e. } W = PU/2A$$

This equation shows the importance, for a vehicle of given weight, of a low gas leakage velocity combined with a high thrust amplification coefficient.

SUMMARY OF THE INVENTION

The present invention is directed to a system for the confinement of a gas cushion for a vehicle exhibiting, in the domain of thrust amplification, performance comparable with that of the peripheral jet system and, in the domain of stability and gas leakage velocity, performance comparable to that of the plenum chamber system.

The invention contemplates a system for the confinement of a gas cushion for a vehicle, comprising: a central cushion fed by a peripheral jet, delimited by a plurality of walls inclined at an angle of approximately 30 to 45° to the vertical, providing with the aid of relatively flexible lamellae for the guidance of a gas jet at an angle of 30 to 45° relative to the vertical and for recirculation of the gas contained in the central cushion; and one or more cushions of plenum chamber type fed mainly by the leakage gas from the central cushion and delimited by at least one flexible wall surrounding the central cushion, the latter said one or more cushions of plenum chamber type being adapted to be fed, at its upper zone, directly, partially and adjustably.

The invention also contemplates a system as set forth hereinabove and wherein on the one hand the walls of the central cushion include an angle of approximately 40 to 45° with the vertical and, on the other hand, the flexible wall or walls of the one or more plenum chamber cushions are inclined at an angle of approximately 10 to 15° relative to the vertical.

In particular, the plenum chamber cushions are delimited by a plurality of flexible walls each of which forms, with the corresponding wall of the central cushion, a unitary confinement cell.

BRIEF DESCRIPTION OF THE DRAWING

The invention is described hereinbelow, by way of non-limitative example and with reference to the accompanying drawings, wherein.

DETAILED DESCRIPTION

Figure 7:
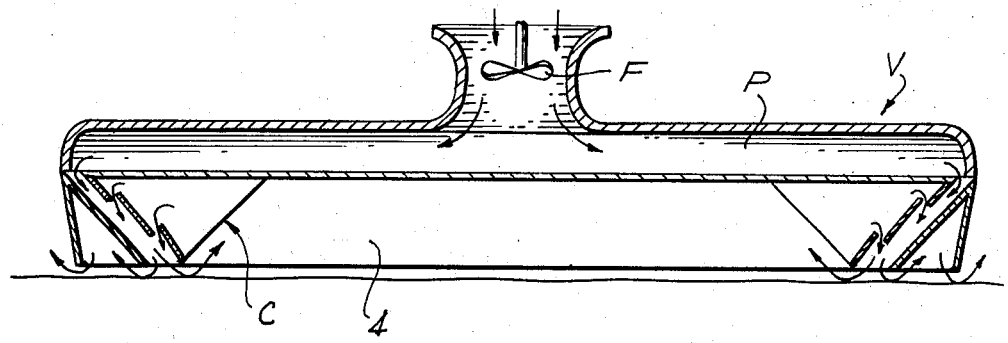
FIG. 7 is a cross-section taken through an air cushion vehicle equipped with skirts similar to those of FIG. 1.
Figure 8:
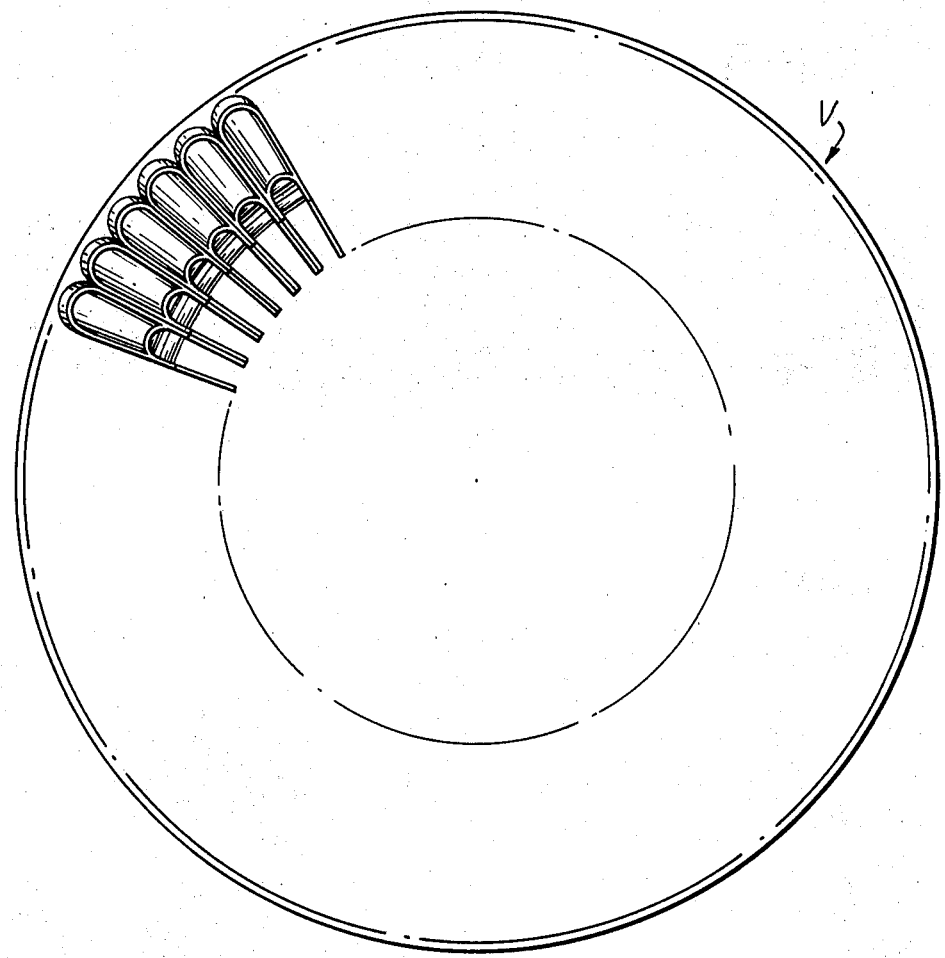
FIG. 8 is a diagrammatic bottom plan view of the vehicle.

Referring to FIGS. 7 and 8 therein is shown a vehicle V in the form of a circular platform which is intended to ride on a cushion of air. The vehicle carries an array of cells at its periphery for producing an air cushion on which the vehicle can ride. The air is supplied under pressure by a fan F into a passageway P where it is conveyed to each of the cells.

Figure 3:
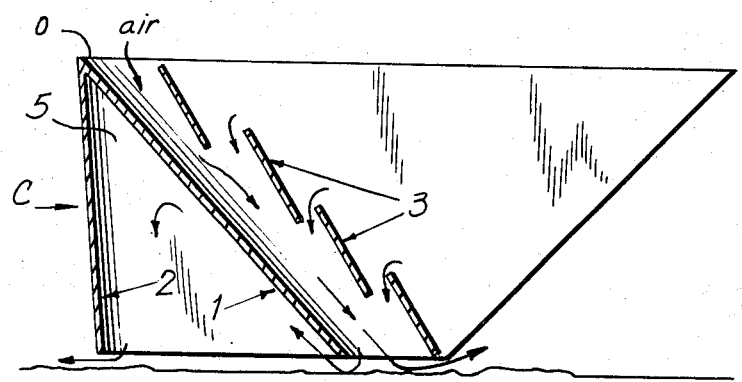
FIG. 3 is a section taken along the plane of symmetry of the cell of FIG. 1, the arrows indicating the circulation of the gas within the cell.
Figure 4:
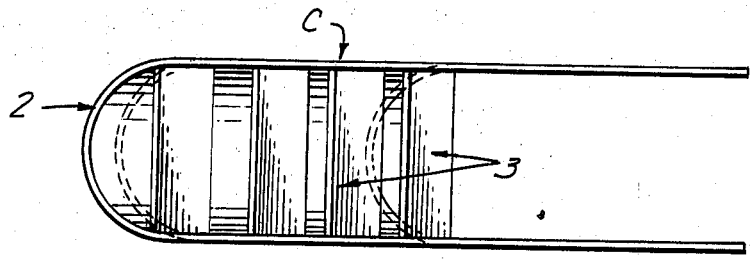
FIG. 4 is a plan view of the cell of FIG. 1.

Referring specifically to FIG. 3 the air is shown as being introduced through an opening 0 at the top of the cell, and the air flows in the form of a jet through a passage formed between a wall 1 of flexible material and a plurality of overlapped spaced wall elements or lamellae 3. The wall 1 is inclined at an angle of about 40 to 45° to the vertical and the lamellae are arrayed along a line parallel to wall 1, the individual lamellae being disposed at an angle of 30 to 45° to the vertical. The spaced relation of wall elements 3 provides for a recirculation of air within the cushion as will be explained more fully later. The air passes from the bottom of the peripheral passages formed between the wall 1 and the wall elements 3 of the individual cells and flows inwardly to a central cushion 4. The air escaping from cushion 4 flows outwardly and the air is introduced into a plenum chamber 5 as shown by the arrows in FIGS. 3, 5, 6 and 7. The plenum chamber 5 of each cell is formed by an outer flexible wall 2 surrounding wall 1.

The flexible wall 2 is inclined at an angle of approximately 10 to 15° to the vertical and has a convexity which is orientated towards the exterior of the vehicle, on the one hand to provide for a low gas leakage velocity and on the other hand to improve the stability of the vehicle.

Figure 1:
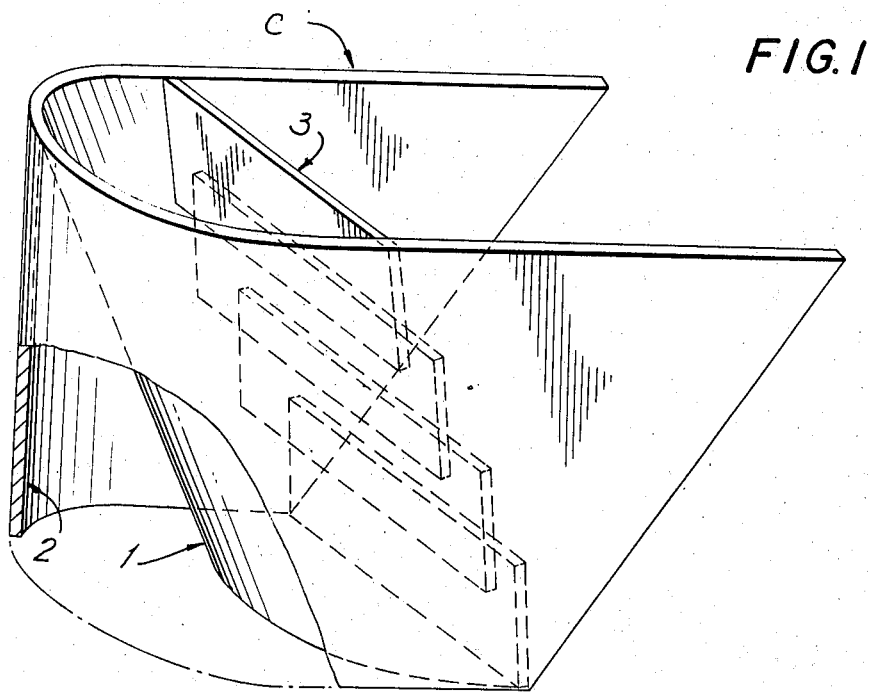
FIG. 1 is a perspective view of a confinement cell.
Figure 2:
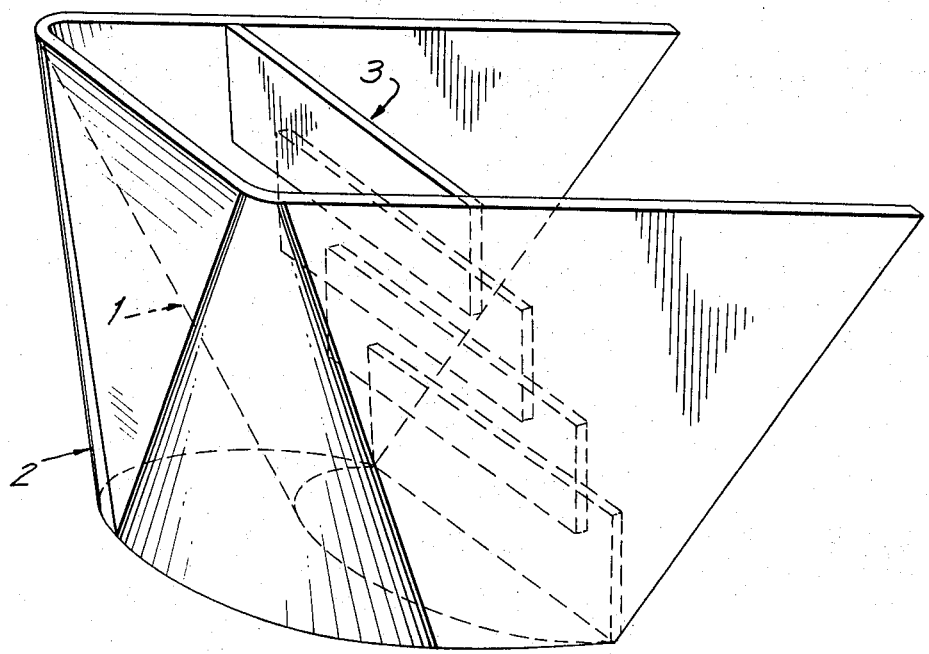
FIG. 2 shows a variant of the cell of FIG. 1.

The flexible wall 2 can be smoothly rounded as shown in FIG. 1 or it can have a modified shape with a planar face as shown at 2' in FIG. 2. In lieu of individual plenum chambers 5 for each cell, the wall 2 could be formed cylindrically to provide a single common plenum chamber for all cells.

Figure 5:
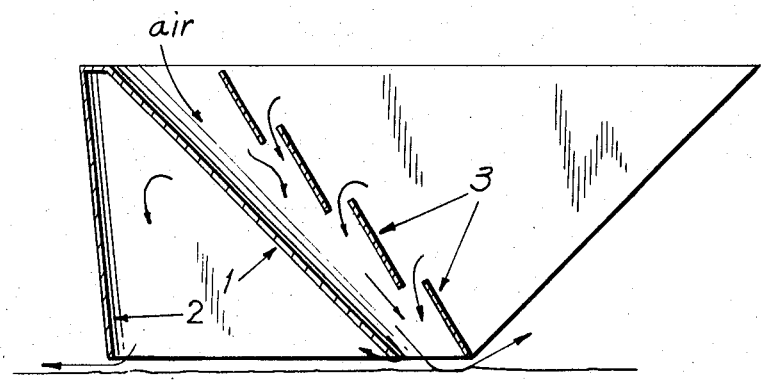
FIG. 5 is a section taken along the plane of symmetry of a variant.
Figure 6:
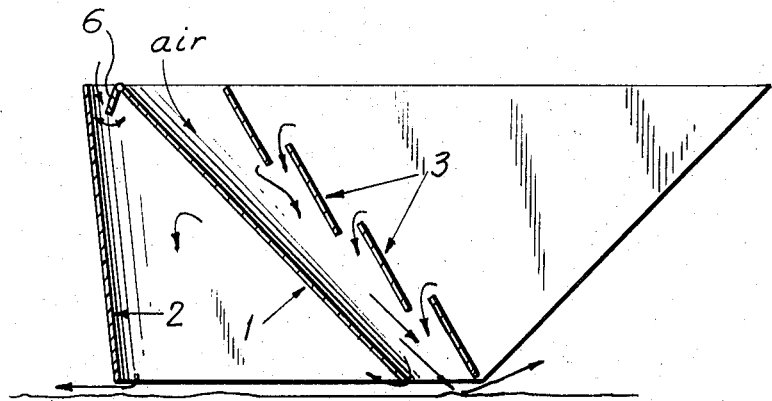
FIG. 6 is a section of a variant of the cell of FIG. 5.

The chamber 5 can be closed at its upper end as shown in FIGS. 1, 3 and 5 in which case the plenum chamber is supplied with air only from below. Alternatively as shown in FIG. 6 the plenum chamber can be open at its top to receive air directly from passageway P. A control plate 6 can be pivotably mounted at the top of each cell to control the size of the opening through which the air is admitted to the plenum chamber.

The wall elements 3 extend across the width of each cell and their ends are mounted in the flexible wall 1.

The relatively flexible wall elements 3 have the following dual role:

1. to cooperate with the wall 1 to guide the peripheral jet of air; and
2. to act as nozzles for recirculation of the air contained within the cushion.

From the above, it is seen that apparatus has been provided for the confinement of an air cushion comprising means constituted by wall 1 for defining central cavity 4, pressure air supply means F, P, means constituted by lamellae 3 to guide the flow of pressure air at an angle of 30 to 45° relative to the vertical and to introduce the air into the central cushion 4 at the bottom thereof while permitting recirculation of the air within cushion 4 into the guided flow of air, and wall means 2 surrounding wall 1 and cavity 4 and fed by leakage air from the central cushion and the guided air flow to form plenum chamber 5 constituting an auxiliary cushion.

What is claimed is:

1. Apparatus for the confinement of a gas cushion of a vehicle which rides on the gas cushion, said apparatus comprising means defining a central cavity which is closed from above, pressure gas supply means, means at the periphery of the central cavity for feeding the gas from the supply means into the central cavity at the outer periphery thereof to form a central gas cushion in said cavity, the latter means including an outer wall means inclined downwardly and inwardly at an angle of between 30 and 45° to the vertical, a plurality of flexible wall elements within and facing said outer wall means to form a passage for flow of gas from the supply means into the central gas cushion, said wall elements being arranged in overlapping spaced relation to permit recirculation of the pressure gas from the gas cushion into the passage between the outer wall means and the wall elements at the periphery of the gas cushion, and flexible wall members surrounding the wall means to form a plenum chamber constituting an auxiliary cushion fed by leakage gas from the central cushion, said flexible wall members defining with said outer wall means individual cells surrounding said passage.

2. Apparatus as claimed in claim 10 wherein said flexible wall members are inclined at an angle of about 10 to 15° relative to the vertical.

3. Apparatus as claimed in claim 1 wherein said wall elements within and facing said wall means are inclined at an angle between 30 and 45° relative to the vertical.

4. Apparatus as claimed in claim 1 wherein said outer wall means is inclined at an angle of 40 to 45° relative to the vertical.

5. Apparatus as claimed in claim 4 wherein said outer wall means comprises walls of flexible material.

6. Apparatus as claimed in claim 1 comprising means providing communication between the plenum chamber and the gas supply means for direct supply of pressure gas to the plenum chamber.

7. Apparatus as claimed in claim 6 comprising means for controlling admission of pressure gas to the plenum chamber.

8. Apparatus as claimed in claim 6 wherein the communication between the plenum chamber and the gas supply means is provided by an opening in the plenum chamber at the upper end thereof.

9. Apparatus as claimed in claim 1 wherein the outer wall means comprises a plurality of individual elements forming respective cells cooperating with associated wall elements to form respective passage leading from the gas supply means to the central cavity.

10. Apparatus as claimed in claim 1 wherein said wall elements are flat lamellae.

* * * * *